(12) United States Patent
Lee et al.

(10) Patent No.: US 7,768,984 B2
(45) Date of Patent: Aug. 3, 2010

(54) APPARATUS AND METHOD FOR RECEIVING A SIGNAL IN A COMMUNICATION SYSTEM

(75) Inventors: Joo-Hyun Lee, Suwon-si (KR); Keun-Chul Hwang, Seongnam-si (KR); Soon-Young Yoon, Seoul (KR); Sung-Soo Hwang, Suwon-si (KR); June Moon, Seoul (KR); Ki-Young Han, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 652 days.

(21) Appl. No.: 11/650,897

(22) Filed: Jan. 8, 2007

(65) Prior Publication Data
US 2007/0183544 A1    Aug. 9, 2007

(30) Foreign Application Priority Data
Jan. 6, 2006    (KR) .................... 10-2006-0001892

(51) Int. Cl.
*H04W 4/00* (2009.01)
(52) U.S. Cl. ...................................... 370/338; 370/334
(58) Field of Classification Search ................. 370/338, 370/334; 455/500, 62, 525, 63.1, 67.13, 455/70, 71, 131, 132, 150.1, 154.1, 278.1
See application file for complete search history.

(56) References Cited

U.S. PATENT DOCUMENTS

| 6,829,307 | B1* | 12/2004 | Hoo et al. | 375/260 |
| 2003/0125040 | A1* | 7/2003 | Walton et al. | 455/454 |
| 2004/0151254 | A1 | 8/2004 | Yang et al. | |
| 2006/0276228 | A1* | 12/2006 | Jin et al. | 455/562.1 |

FOREIGN PATENT DOCUMENTS

| KR | 1020020063622 | 8/2002 |
| KR | 1020050079856 | 8/2005 |
| KR | 1020070072794 | 7/2007 |

* cited by examiner

*Primary Examiner*—Kent Chang
*Assistant Examiner*—San Htun
(74) *Attorney, Agent, or Firm*—The Farrell Law Firm, LLP

(57) ABSTRACT

In a communication system, information regarding a first modulation scheme applied to a frequency domain in a serving base station is received from the serving base station. A signal of the frequency domain is received. A second modulation scheme is set by estimating a modulation scheme applied to the frequency domain in at least one neighbor base station from the received signal. Channel state information is generated by estimating the received signal. An operation for selecting whether to use interference cancellation is performed using the channel state information, the first modulation scheme information and the second modulation scheme.

16 Claims, 8 Drawing Sheets

APPARATUS AND METHOD FOR RECEIVING A SIGNAL IN A COMMUNICATION SYSTEM

PRIORITY

This application claims priority under 35 U.S.C. §119(a) to an application filed in the Korean Intellectual Property Office on Jan. 6, 2006 and assigned Serial No. 2006-1892, the contents of which are incorporated herein by reference.

BACKGROUND OF THE INVENTION

1. Field of the Invention

The present invention generally relates to an apparatus and method for receiving a signal in a communication system, and more particularly to an apparatus and method for receiving a signal by selecting whether to use interference cancellation according to a modulation scheme in a communication system.

2. Description of the Related Art

Since limited resources such as frequency, code and timeslot resources, are divided and used in multiple cells of a communication system with a cellular structure (hereinafter cellular communication system), Inter-Cell Interference (ICI) may occur.

When the frequency resources are divided and used in the multiple cells of the cellular communication system, the ICI results in performance degradation. The frequency resources are reused to increase the overall capacity of the cellular communication system. Herein, the rate at which the same frequency resources can be reused is referred to as a "frequency reuse factor". The frequency reuse factor is defined by the number of cells in which the same frequency resources are unused. Assuming that the frequency reuse factor is 1/K, the number of cells in which the same frequency resources are unused becomes K.

As the frequency reuse factor is small, that is, when the frequency reuse factor is less than 1, ICI decreases but an amount of frequency resources available in one cell decreases. Thus the overall capacity of the cellular communication system also decreases. In contrast, when the frequency reuse factor is 1, that is, all of the cells in the cellular communication system use the same frequency resources, ICI increases but an amount of frequency resources available in one cell increases. Thus the overall capacity of the cellular communication system also increases.

Substantial research is being conducted on next generation communication systems for providing users with services based on various classes of Quality of Service (QoS) at a high transmission rate. Among the next generation communication systems, a typical communication system is an Institute of Electrical and Electronics Engineers (IEEE) 802.16e communication system, which is a cellular communication system.

FIG. 1 illustrates a structure of the conventional IEEE 802.16e communication system.

Referring to FIG. 1, the IEEE 802.16e communication system has a multi-cell structure, that is, a cell 100 and a cell 150, and includes a Base Station (BS) 110 covering the cell 100, a BS 140 covering the cell 150, and multiple Mobile Stations (MSs) 111, 113, 130, 151 and 153.

The IEEE 802.16e communication system as illustrated in FIG. 1 has a frequency reuse factor of 1. In this case, an amount of frequency resources available in one cell increases along with the efficiency of frequency resources. However, since frequency resources, that is, sub-carriers, are the same between a serving BS and a neighbor BS in a cell overlap area, ICI may occur, degrading the performance of signal reception from the serving BS in an MS located in the cell overlap area.

To compensate for this degradation, the IEEE 802.16e communication system applies a most robust Modulation and Coding Scheme (MCS) level available therein, modulates and codes MAP information, and transmits the modulated and coded MAP information. Herein, all the BSs of the IEEE 802.16e communication system use the same most robust MCS level. The MAP information includes control information such as position information regarding downlink and uplink burst regions, modulation scheme information, and allocation information of the downlink and uplink regions, that is, information regarding whether the downlink and uplink burst regions are dedicatedly allocated to a specific MS or are commonly allocated to unspecific MSs. For example, the IEEE 802.16e communication system modulates and codes the MAP information at a Quadrature Phase Shift Keying (QPSK) ½ level and then transmits the MAP information after a maximum of six repeats.

The reception performance of the MAP information in the MS located in the cell overlap area may not be improved to a level desired in the IEEE 802.16e communication system even when the MAP information is transmitted at the most robust MCS level available in the IEEE 802.16e communication system. Thus, to eliminate the ICI the IEEE 802.16e communication systems use special interference cancellation schemes such as successive interference cancellation (SIC).

The performance of the SIC scheme depends on a range of a Signal to Interference and Noise Ratio (SINR). For example, as the SINR is low, that is, a size of an interference signal is large, the performance of the SIC scheme is superior. In contrast, as the SINR is high, that is, the size of the interference signal is small, the performance of the SIC scheme is inferior. Thus a scheme for selecting whether to use the SIC scheme according to an SINR (hereinafter Norm SIC scheme) has been proposed to eliminate the performance degradation in an SNR range of the SIC scheme.

The Norm SIC scheme uses a ratio between the channel powers of a serving BS and of a neighbor BS as a measure of the SINR. When a measured SINR is less than a threshold SINR, that is, an interference signal can be correctly measured, a control operation is performed such that the SIC scheme is used. In contrast, when the measured SINR is equal to or greater than the threshold SINR, that is, the interference signal cannot be correctly measured, a control operation is performed such that the SIC scheme is unused. However, the Norm SIC scheme may ensure sub-optimal performance only when the same modulation scheme as that of the neighbor BS is used, that is, the same modulation scheme is applied to a desired signal and an interference signal, as when all the BSs of the IEEE 802.16e communication system transmit MAP information. Herein, the neighbor BS transmits the interference signal in a frequency domain, that is, a sub-channel, equal to that in which the desired signal is transmitted. The sub-channel includes at least one sub-carrier.

However, when the IEEE 802.16e communication system conventionally transmits traffic data, modulation schemes applied to the desired signal and the interference signal are usually different. The above-described Norm SIC scheme may ensure optimal performance when the modulation schemes applied to the desired signal and the interference signal are the same. However, when different modulation schemes are applied to the interference signal and the desired signal as in the traffic data, the performance level may not be ensured. In the current IEEE 802.16e communication systems, an MS may not detect information regarding a modulation scheme applied to traffic data of a neighbor BS since the MS receives only MAP information of a serving BS without receiving MAP information of the neighbor BS.

SUMMARY OF THE INVENTION

Accordingly, the present invention has been designed to address at least the above problems and/or disadvantages and to provide at least the advantages described below. Accordingly, an object of the present invention is to provide an apparatus and method for receiving a signal in a communication system.

An object of the present invention is to provide an apparatus and method for receiving a signal by selecting whether to use interference cancellation according to a modulation scheme in a communication system.

An object of the present invention is to provide an apparatus and method for receiving a signal by selecting whether to use interference cancellation according to a modulation scheme for each of the signal detection schemes available in a communication system.

An object of the present invention is to provide an apparatus and method for receiving a signal by estimating a modulation scheme used by a neighbor base station and selecting whether to use interference cancellation according to the estimated modulation scheme and a modulation scheme used by a serving base station in a communication system.

In accordance with the present invention, there is provided a communication system in which information regarding a first modulation scheme applied to a frequency domain in a serving base station is received from the serving base station, a signal of the frequency domain is received, a second modulation scheme is set by estimating a modulation scheme applied to the frequency domain in at least one neighbor base station from the received signal, channel state information is generated by estimating the received signal and an operation for selecting whether to use interference cancellation is performed using the channel state information, the first modulation scheme information and the second modulation scheme.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE PREFERRED EMBODIMENTS

The matters defined in the description are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Hereinafter, for convenience of explanation, an Institute of Electrical and Electronics Engineers (IEEE) 802.16e communication system serving as an example of the communication system will be described. It is noted that an apparatus and method for eliminating an interference signal according to a modulation scheme disclosed in the preferred embodiments of the present invention can be applied to other communication systems in addition to the IEEE 802.16e communication system.

Figure 1:
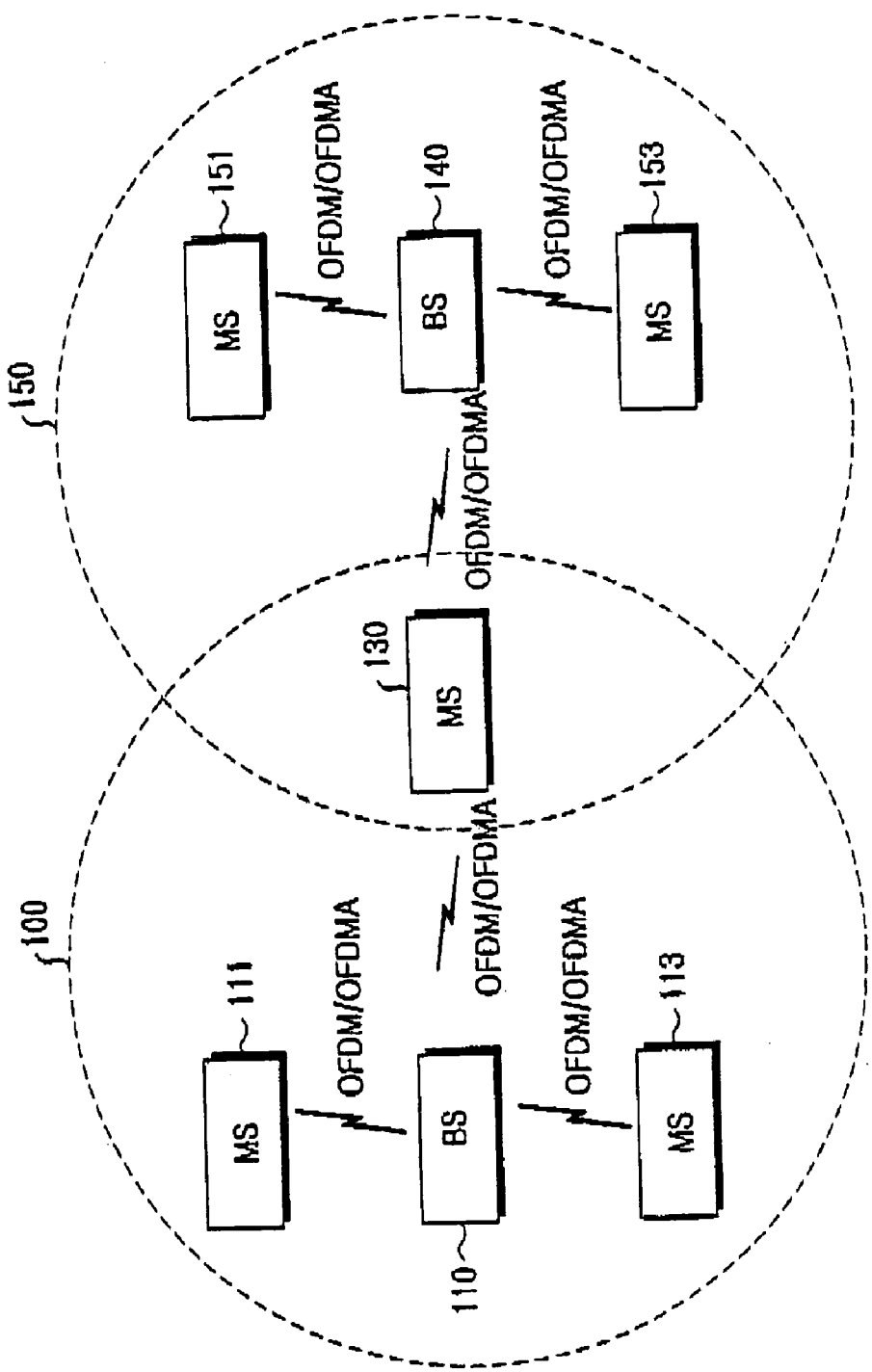
FIG. 1 illustrates a structure of a conventional IEEE 802.16e communication system.
Figure 2:
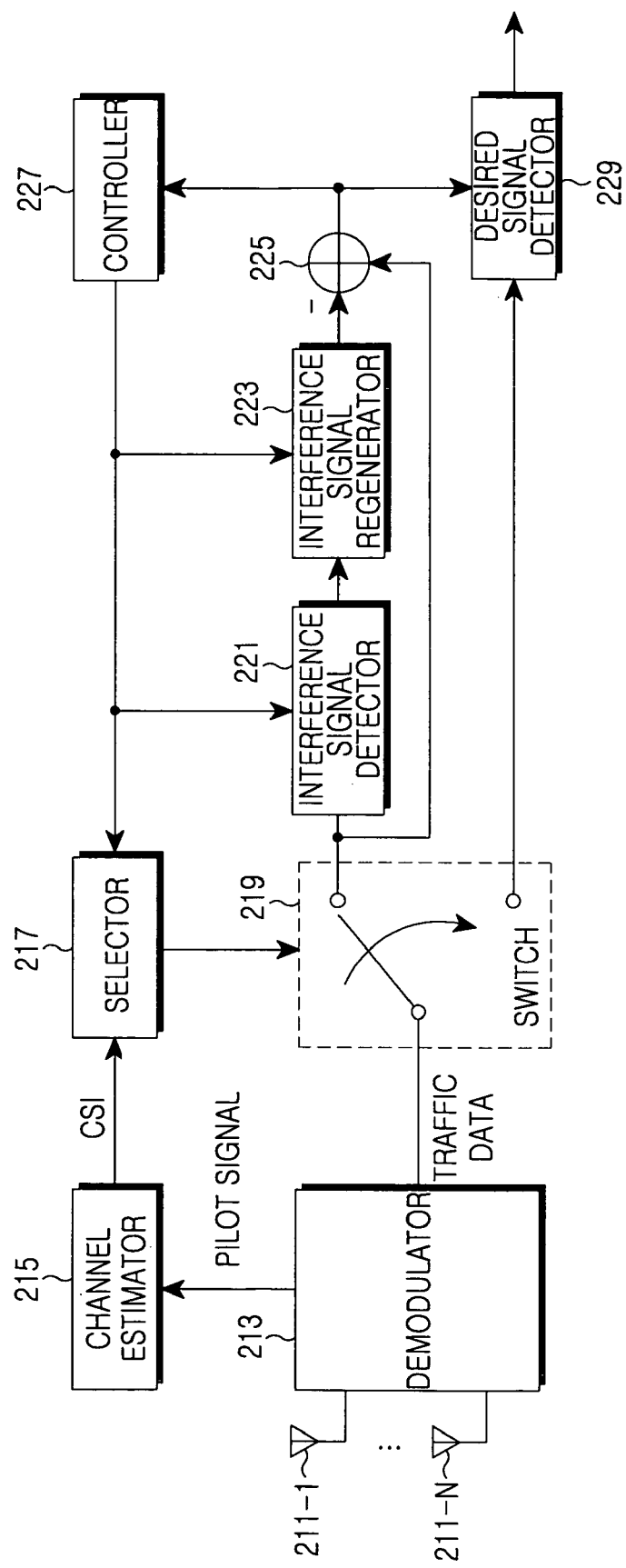
FIG. 2 illustrates an internal structure of a signal reception apparatus in an IEEE 802.16e communication system in accordance with the present invention.

FIG. 2 illustrates an internal structure of a signal reception apparatus in the IEEE 802.16e communication system in accordance with the present invention.

As discussed in the Background section herein, in the current IEEE 802.16e communication systems, an MS receives only MAP information of a serving BS without receiving MAP information of neighbor BSs. Thus the MS cannot detect information regarding modulation schemes applied in the neighbor BSs. In FIG. 2, for convenience of explanation, only one neighbor BS is considered. Thus the signal reception apparatus receives signals from the serving BS and the neighbor BS. An interference cancellation scheme disclosed in the present invention can be applied also to when at least two neighbor BSs are provided. That is, when the MS uses the interference cancellation scheme for at least two neighbor BSs, a signal of other neighbor BSs is regarded as noise. In the present invention, the interference cancellation can be performed also for at least two neighbor BSs, by applying interference cancellation schemes the number of which corresponds to the number of neighbor BSs or applying an interference cancellation scheme only once by increasing the number of interference signals therein. When applying the interference cancellation scheme only for one neighbor BS, the MS first selects one neighbor BS having a largest interference signal among signals received from at least two neighbor BSs, that is, interference signals, and then regards interference signals of the remaining neighbor BSs as noise, such that the interference cancellation scheme disclosed in the present invention can be applied. In the IEEE 802.16e communication system, the MAP information is conventionally transmitted before a data burst and enables the MS to normally receive the data burst.

Referring to FIG. 2, the signal reception apparatus is provided with multiple receive antennas, for example, a total of N receive antennas of a first receive antenna 211-1 to an n-th receive antenna 211-N, a demodulator 213, a channel estimator 215, a selector 217, a switch 219, an interference signal detector 221, an interference signal regenerator 223, a subtractor 225, a controller 227 and a desired signal detector 229.

Although not illustrated in FIG. 2, MAP information transmitted on a sub-channel from the serving BS is received through the first receive antenna 211-1 to the n-th receive antenna 211-N of the signal reception apparatus when the serving BS transmits the MAP information of a predefined frequency domain such as the sub-channel. Although signals received through the first receive antenna 211-1 to the n-th receive antenna 211-N are not illustrated in FIG. 2, the received signals undergo a Radio Frequency (RF) process and a Fast Fourier Transform (FFT) process and then are output to the demodulator 213. The demodulator 213 receives FFT MAP information, demodulates the received FFT MAP information in a predefined demodulation scheme, and outputs the demodulated MAP information to a MAP decoder (not illustrated). Since the serving BS transmits the MAP information at the most robust MCS level, a demodulation scheme used to demodulate the MAP information is mapped to a modulation scheme at the most robust MCS level.

The MAP decoder decodes a signal output from the demodulator 213 using a predefined decoding scheme and recovers the MAP information transmitted from the serving BS. The signal reception apparatus can detect information regarding a modulation scheme applied to a data burst transmitted from the serving BS using a specific sub-channel and also can detect a position of a pilot signal within the data burst, by recovering the MAP information transmitted from the serving BS.

When the serving BS transmits the data burst on the specific sub-channel, the signal reception apparatus receives a signal including both the data burst transmitted from the serving BS, that is, a desired signal, and an interference signal transmitted from a neighbor BS using a sub-channel equal to the specific sub-channel. Herein, the desired signal is transmitted from the serving BS using the specific sub-channel and the interference signal is transmitted from the neighbor BS using the specific sub-channel. That is, the desired signal transmitted from the serving BS and the interference signal transmitted from the neighbor BS are received through the first receive antenna 211-1 to the n-th receive antenna 211-N. The signal reception apparatus receives a signal in which the desired signal and the interference signal are mixed on an associated sub-channel mapped to the MAP information received from the serving BS.

Like the MAP information, the signals received through the first receive antenna 211-1 to the n-th receive antenna 211-N undergo an RF process and an FFT process and then are output to the demodulator 213. The demodulator 213 receives an FFT signal and demodulates the received FFT signal in a predefined demodulation scheme. A pilot signal is output to the channel estimator 215. Traffic data is buffered in a buffer provided in the demodulator 213. Herein, the demodulator 213 demodulates the FFT signal in a demodulation scheme mapped to the MAP information received from the serving BS.

The channel estimator 215 receives the pilot signal output from the demodulator 213, estimates a channel coefficient and noise variance by performing channel estimation, and generates Channel State Information (CSI) using the estimated channel coefficient and noise variance. Herein, the CSI can be generated as channel power information or an SINR, and can be generated as channel power information or an SINR mapped to a signal detection scheme used in the signal reception apparatus. Herein, the signal detection scheme can be a Maximum Ratio Combining (MRC) or Minimum Mean Square Error (MMSE) scheme. For example, the channel estimator 215 generates the channel power information with the CSI when MRC is used in the signal detection scheme, and generates the SINR with the CSI when MMSE is used in the signal detection scheme. The channel estimator 215 outputs the generated CSI to the selector 217.

As described above, since the signal reception apparatus recovers only MAP information of a serving BS without recovering MAP information of a neighbor BS in the current IEEE 802.16e communication systems, the signal reception apparatus may not detect a modulation scheme applied to a sub-channel of the neighbor BS equal to that of the serving BS for transmitting a data burst. That is, the signal reception apparatus may not detect the modulation scheme applied to the sub-channel on which an interference signal is transmitted from the neighbor BS. Hereinafter, for convenience of explanation, the modulation scheme applied to the interference signal is referred to as the interference (signal) modulation scheme.

A scheme for eliminating interference by considering a modulation scheme in a preferred embodiment of the present invention should also consider the interference modulation scheme. Thus the controller 227 estimates the interference modulation scheme and sets the estimated interference modulation scheme to a target estimation interference modulation scheme. The controller 227 outputs information regarding the target estimation interference modulation scheme to the selector 217, the interference signal detector 221, the interference signal regenerator 223 and the desired signal detector 229. Herein, the target estimation interference modulation scheme is an interference modulation scheme finally set by the controller 227.

The controller 227 can use two schemes to set the target estimation interference modulation scheme. The first scheme sets the target estimation interference modulation scheme to a modulation scheme mapped to the most robust MCS level, that is, a modulation scheme of highest modulation order (hereinafter highest-order modulation scheme).

The second scheme sets the interference modulation scheme to a temporary estimation interference modulation scheme while sequentially increasing the modulation order from a modulation scheme of predefined lowest modulation order (hereinafter lowest-order modulation scheme) to the highest-order modulation scheme. A short-term Mean Square Error (MSE) value of the highest-order modulation scheme applied to the traffic data is compared with that of the temporary estimation interference modulation scheme applied to the traffic data. When the short-term MSE value of the temporary estimation interference modulation scheme is less than or equal to that of the highest-order modulation scheme, the temporary estimation interference modulation scheme is set to the target estimation interference modulation scheme.

Next, the first scheme for setting the target estimation interference modulation scheme will be described in detail.

The controller 227 assumes that the target estimation interference modulation scheme is the highest-order modulation scheme as shown in Equation (1).

$$k_i = k_{max} \quad (1)$$

In Equation (1), the subscript i is an index of the interference signal, k is the modulation order, and $k_{max}$ is the highest modulation order.

For example, since the IEEE 802.16e communication system can use modulation schemes ranging from a BPSK scheme to a 64QAM scheme, the highest-order modulation scheme becomes the 64QAM scheme. Thus the controller 227 can set the target estimation interference modulation scheme to the 64QAM scheme. In this case, since quantization error of an arbitrary modulation scheme can be minimized when excluding the case where the signal reception apparatus exactly knows a modulation scheme actually applied to the interference signal in the neighbor BS, the signal reception apparatus can also minimize its performance degradation. When the interference modulation scheme actually applied in the neighbor BS is the highest-order modulation scheme, the performance of the signal reception apparatus is not degraded.

For example, assuming that the interference modulation scheme actually applied in the neighbor BS is the 16QAM scheme, the target estimation interference modulation scheme set by the controller 227 is the 64QAM and an error signal from which the interference signal has been eliminated is noise, an SNR of the desired signal can be expressed as shown in Equation (2).

$$SNR = \frac{E(|h_s|^2)P_s}{E(|h_s|^2|h_i|^2)P_e + \sigma^2} \approx \frac{E(|h_s|^2)P_s}{0.0482 \times E(|h_s|^2|h_i|^2)P_s + \sigma^2} \quad (2)$$

In Equation (2), the subscript s is an index of the desired signal, the subscript e is an index of the error signal, h is a channel response, $P_s$ is mean power of a transmitted signal, that is, the desired signal, $P_e$ is mean power of the error signal, and $\sigma^2$ is variance of the noise. Assuming that all channel power values as shown in Equation (2) are normalized to 1 and a transmitted SINR of the desired signal is ∞, an SNR is less than 20.8092 dB after the interference signal has been eliminated from the received signal. Hence, the target estimation interference modulation scheme set to the 64QAM scheme can obtain higher gain in use of the interference cancellation scheme than a modulation scheme different from the 64QAM, such as the QPSK scheme.

When the interference modulation scheme actually applied in the neighbor BS may not be correctly detected, the highest-order modulation scheme is set to the target estimation interference modulation scheme, thereby ensuring the average reception performance in a relatively simple scheme. However, this scheme is effective in terms of simplification and has lower reception performance than a scheme capable of correctly detecting an actual interference modulation scheme. For this reason, the second scheme for setting the target estimation interference modulation scheme can be considered.

Figure 3:
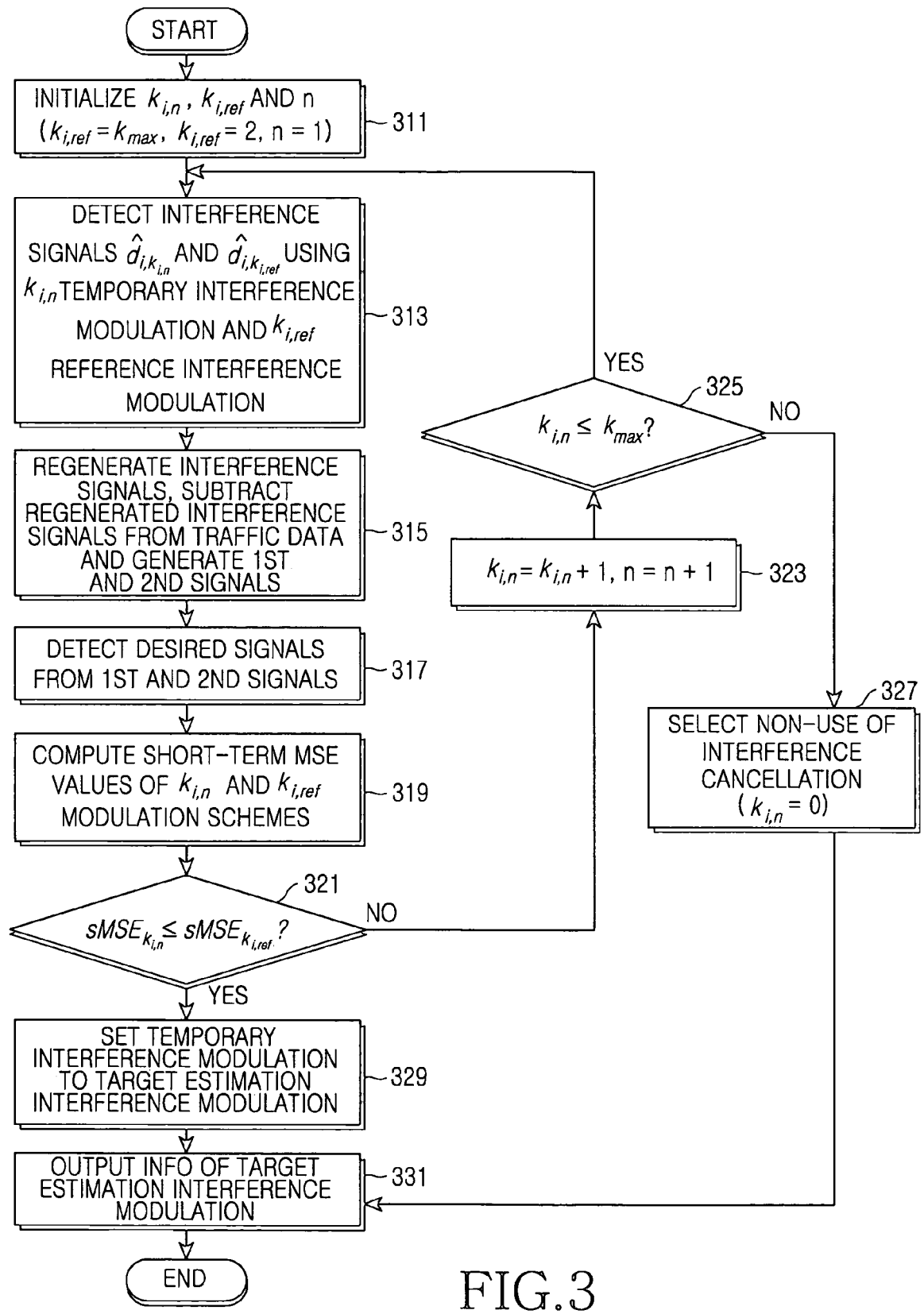
FIG. 3 illustrates a process for setting a target estimation interference (signal) modulation scheme in a controller 227 of FIG. 2.

FIG. 3 illustrates a process for setting the target estimation interference modulation scheme in the controller 227 of FIG. 2.

Referring to FIG. 3, the controller 227 initializes a parameter n representing the number of processes for setting the target estimation interference modulation scheme, a parameter $k_{i,n}$ representing modulation order of a temporary estimation interference modulation scheme set in an n-th process and a parameter $k_{i,ref}$ representing modulation order of a reference interference modulation scheme for setting the target estimation interference modulation scheme in step 311 and then proceeds to step 313.

The controller 227 uses the highest-order modulation scheme as the reference interference modulation scheme and therefore initializes the parameter $k_{i,ref}$ to $k_{max}$ (that is, $k_{i,ref} = k_{max}$). The controller 227 should initialize the parameter $k_{i,n}$ to lowest modulation order of the lowest-order modulation scheme. Assuming that the lowest-order modulation scheme is the QPSK scheme in FIG. 3, the parameter $k_{i,n}$ is initialized to 2 (that is, $k_{i,n}=2$). The controller 227 initializes the parameter n to 1 since the associated process is the first process (that is, n=1).

The controller 227 controls the interference signal detector 221 to detect interference signals from traffic data using the temporary interference modulation scheme mapped to the parameter $k_{i,n}$ and the reference interference modulation scheme, that is, the highest-order modulation scheme, mapped to the parameter $k_{i,ref}$ in step 313 and then proceeds to step 315. Herein, the temporary interference modulation scheme mapped to the parameter $k_{i,n}$ may be referred to as the $k_{i,n}$ temporary interference modulation scheme and the reference interference modulation scheme mapped to the parameter $k_{i,ref}$ may be referred to as the $k_{i,ref}$ reference interference modulation scheme. An interference signal detected by applying the $k_{i,n}$ temporary interference modulation scheme is denoted by $\hat{d}_{i,k_{i,n}}$. An interference signal detected by applying the $k_{i,ref}$ reference interference modulation scheme is denoted by $\hat{d}_{i,k_{i,ref}}$. Herein, d is a transmitted signal.

The controller 227 controls the interference signal regenerator 223 to regenerate the interference signals from the detected interference signals and controls an operation for subtracting the regenerated interference signals of the interference signal regenerator 223 from the traffic data in step 315 and then proceeds to step 317. Herein, a signal obtained by subtracting the regenerated interference signal mapped to the $k_{i,n}$ temporary interference modulation scheme from the traffic data is referred to as a first signal. A signal obtained by subtracting the regenerated interference signal mapped to the $k_{i,ref}$ highest-order modulation scheme from the traffic data is referred to as a second signal. The first signal can be expressed as shown in Equation (3) and the second signal can be expressed as shown in Equation (4).

$$r'_{k_{i,n}} = r - h_i \hat{d}_{i,k_{i,n}} \quad (3)$$

$$r'_{k_{i,ref}} = r - h_i \hat{d}_{i,k_{i,ref}} \quad (4)$$

In Equations (3) and (4), $h_i = [h_{i,1} \; h_{i,2}]^T$ is a channel response for two receive antennas when the signal reception apparatus includes the two receive antennas, where T is transpose.

The controller 227 controls the desired signal detector 229 to detect desired signals from the first and second signals in step 317 and then proceeds to step 319. Herein, the desired signal detected from the first signal can be expressed as shown in Equation (5) and the desired signal detected from the second signal can be expressed as shown in Equation (6).

$$\hat{d}_{s,i,n} = \text{slicer}\{h'_s r'_{k_{i,n}}\} \quad (5)$$

$$\hat{d}_{s,k_{i,ref}} = \text{slicer}\{h'_s r'_{k_{i,ref}}\} \quad (6)$$

In Equations (5) and (6), slicer indicates the use of a slicer.

The controller 227 computes short-term MSE values of the $k_{i,n}$ temporary interference modulation scheme and the $k_{i,ref}$ reference interference modulation scheme in step 319 and then proceeds to step 321. Herein, the controller 227 obtains processing gain by repeating steps 311 to 317 during a predefined time interval T in order to compute the short-term MSE values. The short-term MSE value of the $k_{i,n}$ temporary interference modulation scheme can be expressed as shown in Equation (7) and the short-term MSE value of the $k_{i,ref}$ reference interference modulation scheme can be expressed as shown in Equation (8).

$$sMSE_{k_{i,n}} = \frac{1}{T}\sum_{i=1}^{T} |h_s^* r'_{k_{i,n}} - \hat{a}_{s,k_{i,n}}|^2 \quad (7)$$

$$sMSE_{k_{i,ref}} = \frac{1}{T}\sum_{i=1}^{T} |h_s^* r'_{k_{i,ref}} - \hat{a}_{s,k_{i,ref}}|^2 \quad (8)$$

In step 321, the controller 227 determines whether the short-term MSE value of the $k_{i,n}$ temporary interference modulation scheme is less than or equal to that of the $k_{i,ref}$ reference interference modulation scheme (that is, $sMSE_{k_{i,n}} \leq sMSE_{k_{i,ref}}$). If the short-term MSE value of the $k_{i,n}$ temporary interference modulation scheme is greater than that of the $k_{i,ref}$ reference interference modulation scheme, the controller 227 proceeds to step 323. The controller 227 increments a value of the parameter $k_{i,n}$ by 1 and increments a value of the parameter n by 1 (that is, $k_{i,n}=k_{i,n}+1$ and n=n+1) in step 323 and then proceeds to step 325. The controller 227 determines whether the value of the parameter $k_{i,n}$ is less than or equal to $k_{max}$ (that is, $k_{i,n} \leq k_{max}$) in step 325. If the value of the parameter $k_{i,n}$ is determined to be less than or equal to $k_{max}$, the controller 227 returns to step 313.

However, if the value of the parameter $k_{i,n}$ is determined to be greater than $k_{max}$ in step 325, the controller 227 proceeds to step 327. If the value of the parameter $k_{i,n}$ is greater than $k_{max}$, it means that the signal reception apparatus cannot support the modulation scheme mapped to the parameter $k_{i,n}$. Since the modulation scheme mapped to the parameter $k_{i,n}$ cannot be supported, the controller 227 selects the non-use of the interference cancellation in step 327 and then proceeds to step 331. When the controller 227 does not use the interference cancellation, the value of the parameter $k_{i,n}$ is set to 0 (that is, $k_{i,n}=0$). Accordingly, the value of the parameter $k_{i,n}$ representing the estimation interference modulation scheme set by the controller 227 is set to 0.

However, if the short-term MSE value of the $k_{i,n}$ temporary interference modulation scheme is determined to be less than or equal to that of the $k_{i,ref}$ reference interference modulation scheme in step 321, the controller 227 proceeds to step 329. The controller 227 sets the temporary interference modulation scheme to the target estimation interference modulation scheme in step 329 and then proceeds to step 331. The controller 227 outputs information regarding the target estimation interference modulation scheme to the selector 217, the interference signal detector 221, the interference signal regenerator 223 and the desired signal detector 229 in step 331 and then ends the process.

The selector 217 selects whether to use interference cancellation in the signal reception apparatus using the MAP information output from the MAP decoder, particularly, the modulation scheme information, and the CSI output from the channel estimator 215. An operation for selecting whether to use the interference cancellation in the selector 217 can differ according to signal detection schemes used by the interference signal detector 221 and the desired signal detector 229. Next the operation for selecting whether to use the interference cancellation in the selector 217 for both the MRC and MMSE schemes serving as the signal detection schemes will be described. Since this operation is required for both a modulation scheme to be applied to the desired signal and an interference modulation scheme, the controller 227 should set the target estimation interference modulation scheme before selecting whether to use the interference cancellation.

In the operation for selecting whether to use the interference cancellation in the selector 217, a major parameter for conventionally selecting whether to use the interference cancellation in the signal reception apparatus is an error probability when the interference signal is detected from a received signal. That is, if a detection error probability of the interference signal related to the given CSI in the signal reception apparatus is less than that of the desired signal, gain due to use of the interference cancellation can be obtained when the desired signal is detected after eliminating the detected interference signal from the received signal using the interference cancellation. In contrast, if the detection error probability of the interference signal is greater than or equal to that of the desired signal, incorrect interference signal detection and the degradation of performance due to use of the interference cancellation can be prevented when the interference cancellation is unused. In particular, when interference cancellation using a slicer is applied to a symbol before decoding, a symbol error probability is the major parameter for selecting whether to use the interference cancellation. An optimal condition for selecting whether to use the interference cancellation is given as shown in Equation (9).

$$P_{s,sym} \begin{array}{c} \geq \\ < \end{array} P_{i,sym} \quad \begin{array}{c} \text{ON} \\ \text{OFF} \end{array} \quad (9)$$

In Equation (9), $P_{s,sym}$ is a symbol error probability of the desired signal, $P_{i,sym}$ is a symbol error probability of the interference signal, ON indicates that use of the interference cancellation is selected if an associated condition is satisfied, and OFF indicates that the use of the interference cancellation is not selected if an associated condition is satisfied. If the symbol error probability of the desired signal is equal or greater than or to that of the interference signal as shown in Equation (9), the interference cancellation may be preferably used. If the symbol error probability of the desired signal is less than that of the interference signal, the interference cancellation may be preferably unused.

For example, when the modulation scheme is QPSK, the symbol error probability can be computed as shown in Equation (10) by estimating an SINR per instantaneous symbol in every symbol from the given CSI.

$$P_{QPSK} = Q(\sqrt{\gamma_{sym}}) = Q\left(\sqrt{\frac{|h_{sym}|^2 P_{sym}}{\sigma^2}}\right) \quad (10)$$

In Equation (10), $P_{QPSK}$ is a symbol error probability when the modulation scheme is QPSK, $\gamma_{sym}$ is an SINR per instantaneous symbol, Q(•) is a general Q function, $|h_{sym}|^2$ is channel power of an associated symbol, $P_{sym}$ is transmit power of an associated symbol, and $\sigma^2$ is noise variance.

However, an operation for computing a symbol error probability per symbol as shown in Equation (10) may lead to an increase in complexity. Therefore, the present invention discloses a sub-optimal condition for selecting whether to use the interference cancellation approximated using a characteristic of a monotonic decreasing function corresponding to the Q function. In particular, the present invention discloses sub-optimal conditions for selecting whether to use the interference cancellation in each of the MRC and MMSE schemes serving as the signal detection schemes.

When the signal reception apparatus uses multiple receive antennas, such as two receive antennas, a received signal vector can be expressed as shown in Equation (11).

$$r = \begin{bmatrix} r_1 \\ r_2 \end{bmatrix} = \begin{bmatrix} h_{s,1} & h_{i,1} \\ h_{s,2} & h_{i,2} \end{bmatrix} \begin{bmatrix} d_s \\ d_i \end{bmatrix} + \begin{bmatrix} n_1 \\ n_2 \end{bmatrix} = Hd + n \quad (11)$$

In Equation (11), the subscripts s and i are an index of the desired signal and an index of the interference signal, respectively, $$H = \begin{bmatrix} h_{s,1} & h_{i,1} \\ h_{s,2} & h_{i,2} \end{bmatrix}$$

is a vector of a channel response matrix among the two receive antennas and the serving and neighbor BSs, $$d = \begin{bmatrix} d_s \\ d_i \end{bmatrix}$$

is a vector representing transmitted symbols of the desired signal and the interference signal, and $$n = \begin{bmatrix} n_1 \\ n_2 \end{bmatrix}$$

is a vector representing Additive White Gaussian Noise (AWGN).

When the MRC scheme is used as the signal detection scheme, the sub-optimal condition for selecting whether to use the interference cancellation as shown in Equation (12) can be generated from the optimal condition for selecting whether to use the interference cancellation as shown in Equation (9).

$$P_{s,sym} \overset{\text{ON}}{\underset{\text{OFF}}{\gtrless}} P_{i,sym} \Rightarrow \frac{\gamma_i}{\beta_i k_i} \overset{\text{ON}}{\underset{\text{OFF}}{\gtrless}} \frac{\gamma_s}{\beta_s k_s} \Rightarrow \frac{\sum_{j=1}^{2}|h_{i,j}|^2}{\beta_i k_i} \overset{\text{ON}}{\underset{\text{OFF}}{\gtrless}} \frac{\sum_{j=1}^{2}|h_{s,j}|^2}{\beta_s k_s} \quad (12)$$

In Equation (12), the subscripts s and i are an index of the desired signal and an index of the interference signal, respectively, $\beta$ is a weight based on approximation of a symbol error probability, $\gamma$ is an SINR per symbol, k is modulation order, j is an index of a receive antenna provided in the signal reception apparatus, ON indicates that use of the interference cancellation is selected if an associated condition is satisfied, and OFF indicates that the use of the interference cancellation is not selected if an associated condition is satisfied. In Equation (12), $k_i$ indicates the target estimation interference modulation scheme provided from the controller 227.

In Equation (12), $\beta$ has a variable value, and is the weight assigned to select whether to use the interference cancellation while considering the modulation order, i.e., the modulation scheme. That is, the use of interference cancellation mapped to the sub-optimal condition for selecting whether to use interference cancellation as shown in the rightmost equation of Equation (12) is selected. For example, $\beta$ can be set according to modulation schemes as shown in Table 1.

TABLE 1

|   | BPSK | QPSK | 16QAM | 64QAM |
|---|------|------|-------|-------|
| k | 1    | 2    | 4     | 6     |
| $\beta$ | 1    | 1    | 2.5   | 7     |

In Table 1, $\beta$ differs according to BPSK, QPSK, 16QAM and 64QAM.

When the MMSE scheme is used as the signal detection scheme, an SINR is used as the CSI. A weight matrix based on the MMSE scheme as shown in Equation (13) can be computed from the received signal vector as shown in Equation (11). Hereinafter, for convenience of explanation, the weight matrix based on the MMSE scheme is referred to as the MMSE weight matrix.

$$W = \begin{bmatrix} w_s \\ w_i \end{bmatrix} = (H^H H + \sigma^2 I_2)^{-1} H^H = A H^H \quad (13)$$

In Equation (13), $w_s=[w_{s,1}\ w_{s,2}]^T$ and $w_i=[w_{i,1}\ w_{i,2}]^T$ are a weight vector of the desired signal and a weight vector of the interference signal, respectively, the superscript H is Hermitian, and $A=(H^H H+\sigma^2 I_2)^{-1}$ is an inverse matrix for computing the MMSE weight matrix. Herein, each of the diagonal elements of $A=(H^H H+\sigma^2 I_2)^{-1}$ indicates MSE for an associated transmitted signal. In $w_s=[w_{s,1}\ w_{s,2}]^T$ and $w_i=[w_{i,1}\ w_{i,2}]^T$, T is transpose.

An SINR can be estimated from the MSE as shown in Equation (14).

$$SINR = \frac{E\left(\left|\sum_{n=1}^{2} h_{s,n}\right|^2\right) P_s}{E\left(\left|\sum_{n=1}^{2} h_{i,n}\right|^2\right) P_i + \sigma^2} \approx \frac{1}{MSE} \quad (14)$$

In Equation (14), $P_s$ and $P_i$ are mean symbol powers of the desired signal and of the interference signal, respectively. Assuming that $P_s$ is the same as $P_i$ ($P_s=P_i$), the SINR is approximated to a reciprocal of the MSE. The SINRs of the desired signal and of the interference signal can thus be expressed as $SINR_s=1/a_{11}$ and $SINR_i=1/a_{22}$, respectively. The sub-optimal condition for selecting whether to use the interference cancellation as shown in Equation (15) can be generated from the optimal condition for selecting whether to use the interference cancellation as shown in Equation (9) using these SINRs. $a_{11}$ is a reciprocal of the approximated SINR of the desired signal when the SINR of the desired signal is approximated to a reciprocal of the MSE of the desired signal, and $a_{22}$ is a reciprocal of the approximated SINR of the interference signal when the SINR of the interference signal is approximated to a reciprocal of the MSE of the interference signal.

$$P_{s,sym} \underset{<}{\overset{\geq}{\underset{\text{OFF}}{\overset{\text{ON}}{}}}} P_{i,sym} \Rightarrow \frac{\gamma_i}{\beta_i k_i} \underset{<}{\overset{\geq}{\underset{\text{OFF}}{\overset{\text{ON}}{}}}} \frac{\gamma_s}{\beta_s k_s} \Rightarrow a_{11}\beta_s k_s \underset{<}{\overset{\geq}{\underset{\text{OFF}}{\overset{\text{ON}}{}}}} a_{22}\beta_i k_i \quad (15)$$

The use of the interference cancellation mapped to the sub-optimal condition for selecting whether to use the interference cancellation as shown in the rightmost equation of Equation (15) is selected.

As described above, the selector 217 can select use or non-use of the interference cancellation. First the case where the selector 217 selects the use of the interference cancellation will be described.

When selecting the use of the interference cancellation, the selector 217 controls a switching operation of the switch 219 such that traffic data buffered in the buffer of the demodulator 213 is input to the interference signal detector 221 and the subtractor 225. The interference signal detector 221 detects an interference signal from the traffic data, and outputs the detected interference signal to the interference signal regenerator 223. A signal detection scheme used by the interference signal detector 221 can be the MRC or MMSE scheme. An operation for detecting the interference signal from the traffic data using the MRC or MMSE scheme is a conventional operation. Since the interference signal detection operation is not directly related to the present invention, a detailed description is omitted herein.

The interference signal regenerator 223 receives and regenerates the interference signal output from the interference signal detector 221 and then outputs the regenerated interference signal to the subtractor 225. Herein, an operation for regenerating the interference signal in the interference signal regenerator 223 is a conventional operation. Since the regeneration operation is not directly related to the present invention, a detailed description is omitted herein.

The subtractor 225 subtracts the regenerated interference signal output by the interference signal regenerator 223 from the traffic data output by the demodulator 213, and provides the desired signal detector 229 with an output signal of the subtractor 225. The desired signal detector 229 detects a desired signal from the signal output from the subtractor 225. A signal detection scheme used in the desired signal detector 229 can be the MRC or MMSE scheme, and can be the same as that used in the interference signal detector 221. An operation in which the desired signal detector 229 detects the desired signal from the signal output by the subtractor 225 using the MRC or MMSE scheme is a conventional operation. Since the desired signal detection operation is not directly related to the present invention, a detailed description is omitted herein.

When selecting the non-use of the interference cancellation, the selector 217 controls a switching operation of the switch 219 such that traffic data buffered in the buffer of the demodulator 213 is output only to the subtractor 225. The subtractor 225 outputs the traffic data from the demodulator 213 to the desired signal detector 229 without a special subtraction operation. The desired signal detector 229 detects a desired signal from a signal output from the subtractor 225.

Figure 4:
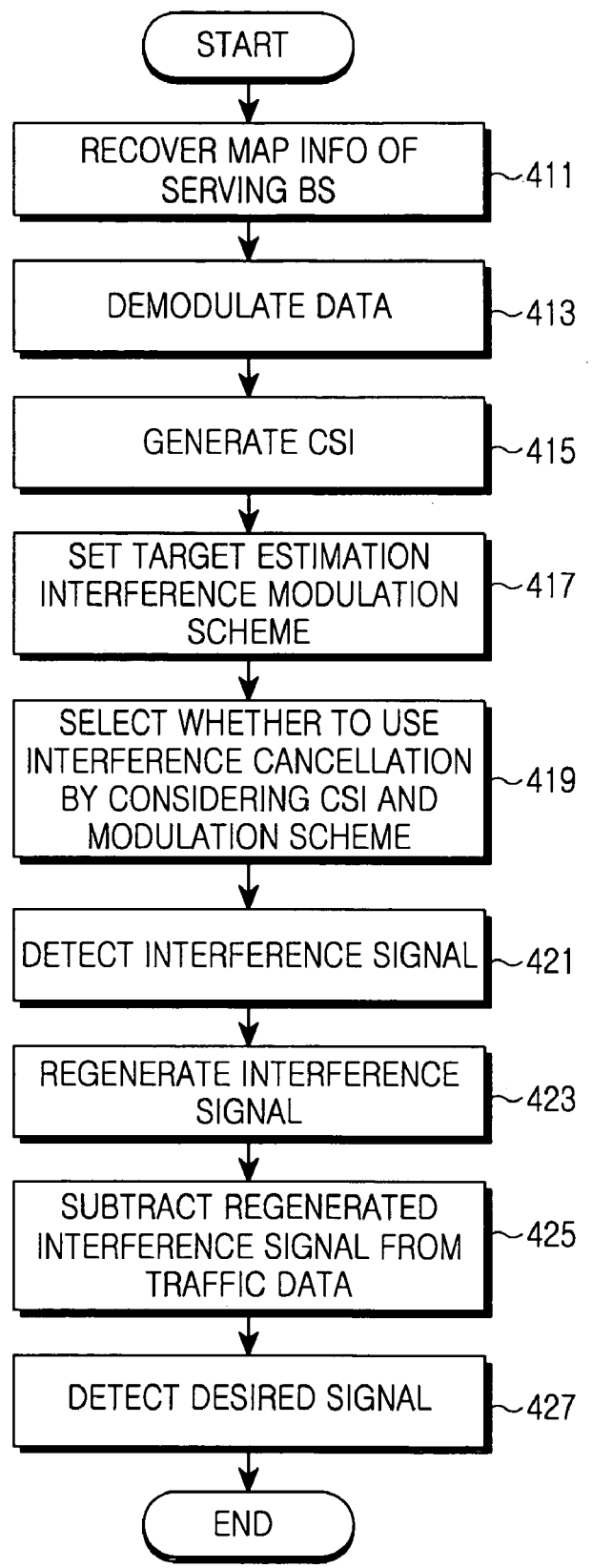
FIG. 4 illustrates an operation process of the signal reception apparatus in which a Minimum Mean Square Error (MMSE) scheme is used as a signal detection scheme.

FIG. 4 illustrates an operation process of the signal reception apparatus in which the MMSE scheme is used as the signal detection scheme.

Referring to FIG. 4, the signal reception apparatus recovers MAP information of a serving BS in step 411 and then proceeds to step 413. The signal reception apparatus demodulates a data burst mapped to the recovered MAP information in step 413 and then proceeds to step 415. Herein, the data burst is demodulated into traffic data and a pilot signal. The signal reception apparatus generates CSI using the pilot signal in step 415 and then proceeds to step 417. Since the MMSE scheme is used as the signal detection scheme, the signal reception apparatus generates an SINR with the CSI.

The signal reception apparatus sets a target estimation interference modulation scheme in step 417 and then proceeds to step 419. Since the operation for setting the target estimation interference modulation scheme has been described above, a detailed description is omitted. The signal reception apparatus selects whether to use the interference cancellation while considering the SINR and a modulation scheme in step 419 and then proceeds to step 421. Since an operation for selecting whether to use the interference cancellation has been described above, a detailed description is omitted.

Upon determining to use the interference cancellation in step 419, the signal reception apparatus proceeds to step 421. The signal reception apparatus detects an interference signal from the traffic data in step 421 and then proceeds to step 423. The signal reception apparatus regenerates the interference signal from the detected interference signal in step 423 and then proceeds to step 425. The signal reception apparatus subtracts the regenerated interference signal from the traffic data in step 425 and then proceeds to step 427. The signal reception apparatus detects a desired signal from a signal generated by subtracting the regenerated interference signal from the traffic data in step 427 and then ends the operation process.

Figure 5:
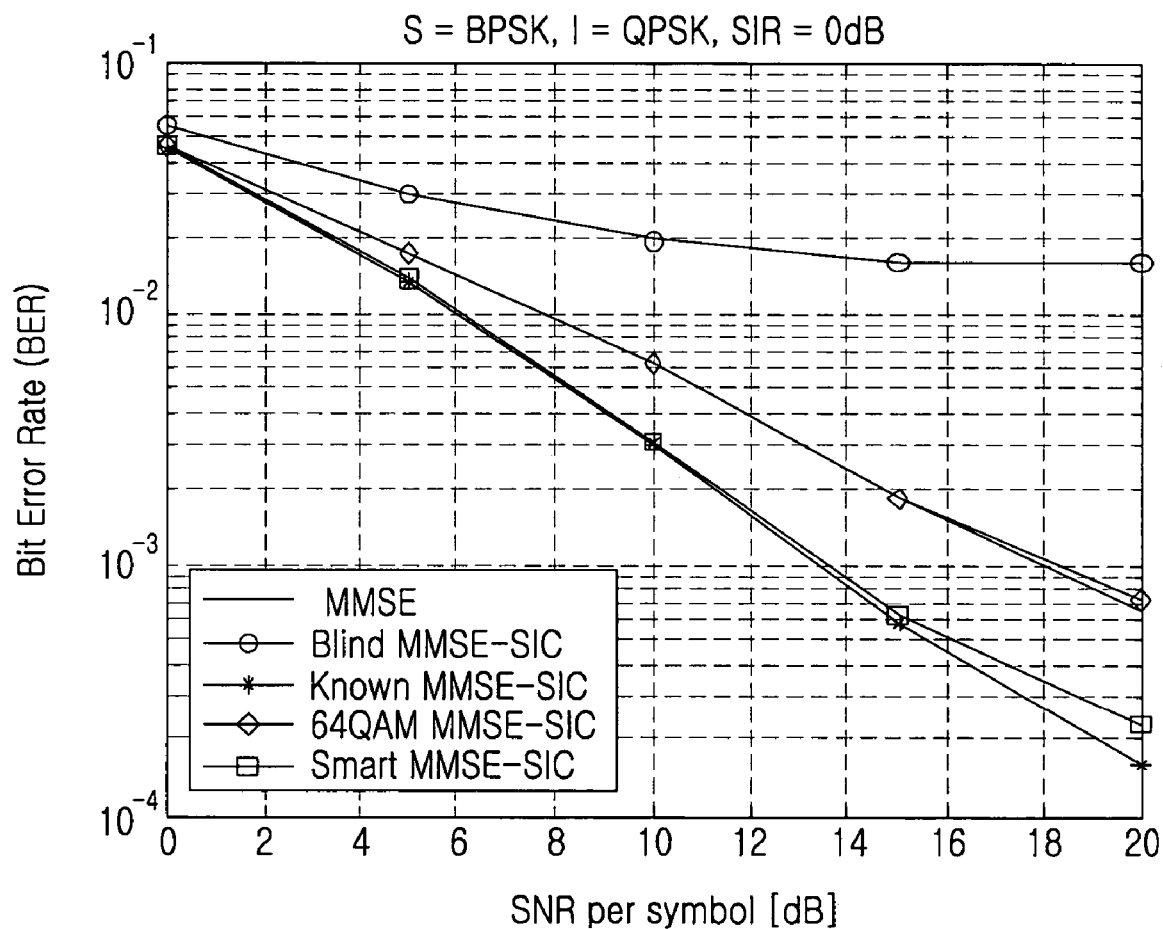
FIG. 5 illustrates the performance of the signal reception apparatus in which a signal detection scheme is an MMSE scheme, a desired signal modulation scheme is a Binary Phase Shift Keying (BPSK) scheme, an actual interference (signal) modulation scheme is a QPSK scheme and a Signal to Interference Ratio (SIR) is 0 dB.

FIG. 5 illustrates the performance of the signal reception apparatus in which a signal detection scheme is an MMSE scheme, a desired signal modulation scheme is a BPSK scheme, an actual interference modulation scheme is a QPSK scheme and an SIR is 0 dB.

In FIG. 5, it is assumed that the signal reception apparatus includes two receive antennas and a Rayleigh fading channel of a single carrier is present. The signal detection scheme is the MMSE scheme, the desired signal modulation scheme is the BPSK scheme, the actual interference modulation scheme is the QPSK scheme and the SIR is 0 dB. Since an influence of the Time interval (T) length is large in which a short-term MSE value is computed when the signal reception apparatus sets a target estimation interference modulation scheme, T is set to, for example, about 100 symbols, in FIG. 5.

In FIG. 5, 'MMSE' indicates a case where the interference cancellation is unused (hereinafter an MMSE case) and 'Blind MMSE-IC' indicates selecting whether to use the interference cancellation by setting the interference modulation scheme equal to the desired signal modulation scheme in a state in which the actual interference modulation scheme applied in the neighbor BS is blind (hereinafter Blind MMSE-IC case). In FIG. 5, 'Known MMSE-IC' indicates selecting whether to use the interference cancellation in a state in which the actual interference modulation scheme applied in the neighbor BS is known (hereinafter Known MMSE-IC case). '64QAM MMSE-IC' indicates selecting whether to use the interference cancellation in a first operation for setting a target estimation interference modulation scheme in accordance with the present invention (hereinafter 64QAM MMSE-IC case). That is, '64QAM MMSE-IC' indicates selecting whether to use the interference cancellation by setting the target estimation interference modulation scheme to the 64QAM scheme. 'Smart MMSE-IC' indicates selecting whether to use the interference cancellation in a second operation for setting a target estimation interference modulation scheme in accordance with the present invention (hereinafter Smart MMSE-IC case).

As illustrated in FIG. 5, the reception performance of the Blind MMSE-IC case is lower than that of the MMSE case and the reception performance of the 64QAM MMSE-IC case is similar to that of the MMSE case. Herein, the reception performance of the 64QAM MMSE-IC case is maintained similar to that of the Known MMSE case since a wrong interference cancellation scheme is unused in the target estimation interference modulation scheme.

As illustrated in FIG. 5, it can be seen that the target estimation interference modulation scheme is relatively correctly detected in the Smart MMSE-IC case. Thus, the Smart MMSE-IC case exhibits the reception performance similar to the Known MMSE-IC case.

Figure 6:
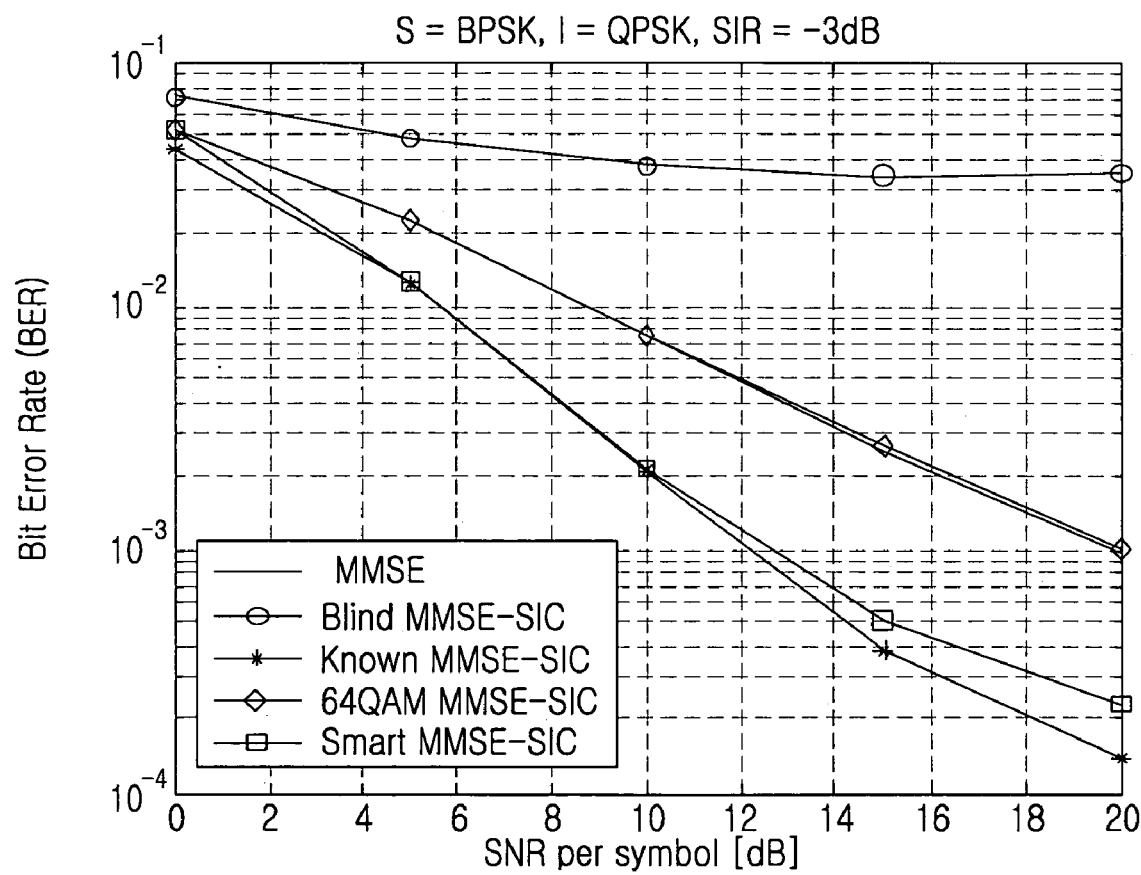
FIG. 6 illustrates the performance of the signal reception apparatus in which a signal detection scheme is an MMSE scheme, a desired signal modulation scheme is a BPSK scheme, an actual interference modulation scheme is a QPSK scheme and an SIR is −3 dB.

FIG. 6 illustrates the performance of the signal reception apparatus in which a signal detection scheme is an MMSE scheme, a desired signal modulation scheme is a BPSK scheme, an actual interference modulation scheme is a QPSK scheme and an SIR is –3 dB.

In FIG. 6, it is assumed that the signal reception apparatus includes two receive antennas and a Rayleigh fading channel of a single carrier is present. The signal detection scheme is the MMSE scheme, the desired signal modulation scheme is the BPSK scheme, the actual interference modulation scheme is the QPSK scheme and the SIR is –3 dB. Since an influence of the Time interval (T) length is large in which a short-term MSE value is computed when the signal reception apparatus sets a target estimation interference modulation scheme, T is set to, for example, about 100 symbols, in FIG. 6. Further, it should be noted that 'MMSE', 'Blind MMSE-IC', 'Known MMSE-IC', '64QAM MMSE-IC' and 'Smart MMSE-IC' as illustrated in FIG. 6 are the same as those as described with reference to FIG. 5.

Characteristics of the performance graph as illustrated in FIG. 6 are analogous to those of the performance graph as illustrated in FIG. 5. In particular, in the Smart MMSE-IC case, it can be seen that the reception performance at the SIR of –3 dB in the performance graph of FIG. 6 is superior to that at the SIR of 0 dB in the performance graph of FIG. 5. As the magnitude of an interference signal increases, gain increases in use of an operation for selecting whether to use interference cancellation in accordance with the present invention.

Figure 7:
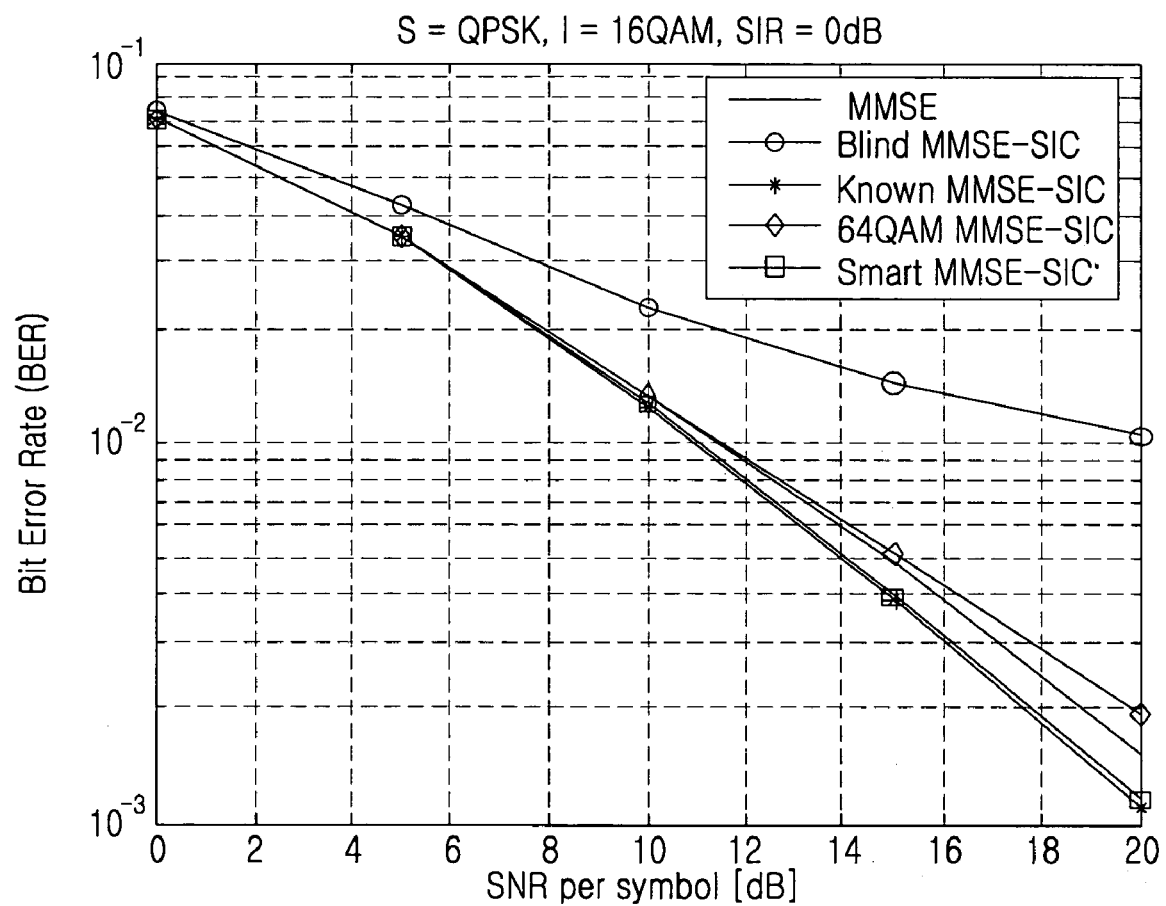
FIG. 7 illustrates the performance of the signal reception apparatus in which a signal detection scheme is an MMSE scheme, a desired signal modulation scheme is a QPSK scheme, an actual interference modulation scheme is a 16-Quadrature Amplitude Modulation (16QAM) scheme and an SIR is 0 dB.

FIG. 7 illustrates the performance of the signal reception apparatus in which a signal detection scheme is an MMSE scheme, a desired signal modulation scheme is a QPSK scheme, an actual interference modulation scheme is a 16QAM scheme and an SIR is 0 dB.

In FIG. 7, it is assumed that the signal reception apparatus includes two receive antennas and a Rayleigh fading channel of a single carrier is present. The signal detection scheme is the MMSE scheme, the desired signal modulation scheme is the QPSK scheme, the actual interference modulation scheme is the 16QM scheme and the SIR is 0 dB. Since an influence of the T length is large in which a short-term MSE value is computed when the signal reception apparatus sets a target estimation interference modulation scheme, T is set to, for example, about 100 symbols, in FIG. 7. Further, it should be noted that 'MMSE', 'Blind MMSE-IC', 'Known MMSE-IC', '64QAM MMSE-IC' and 'Smart MMSE-IC' as illustrated in FIG. 7 are the same as those as described with reference to FIG. 5.

As modulation order increases in the desired signal modulation scheme and the actual interference modulation scheme, the performance graph of FIG. 7 exhibits lower performance gain than that of FIG. 5. However, characteristics of the performance graph as illustrated in FIG. 7 are analogous to those of the performance graph as described with reference to FIG. 5.

Figure 8:
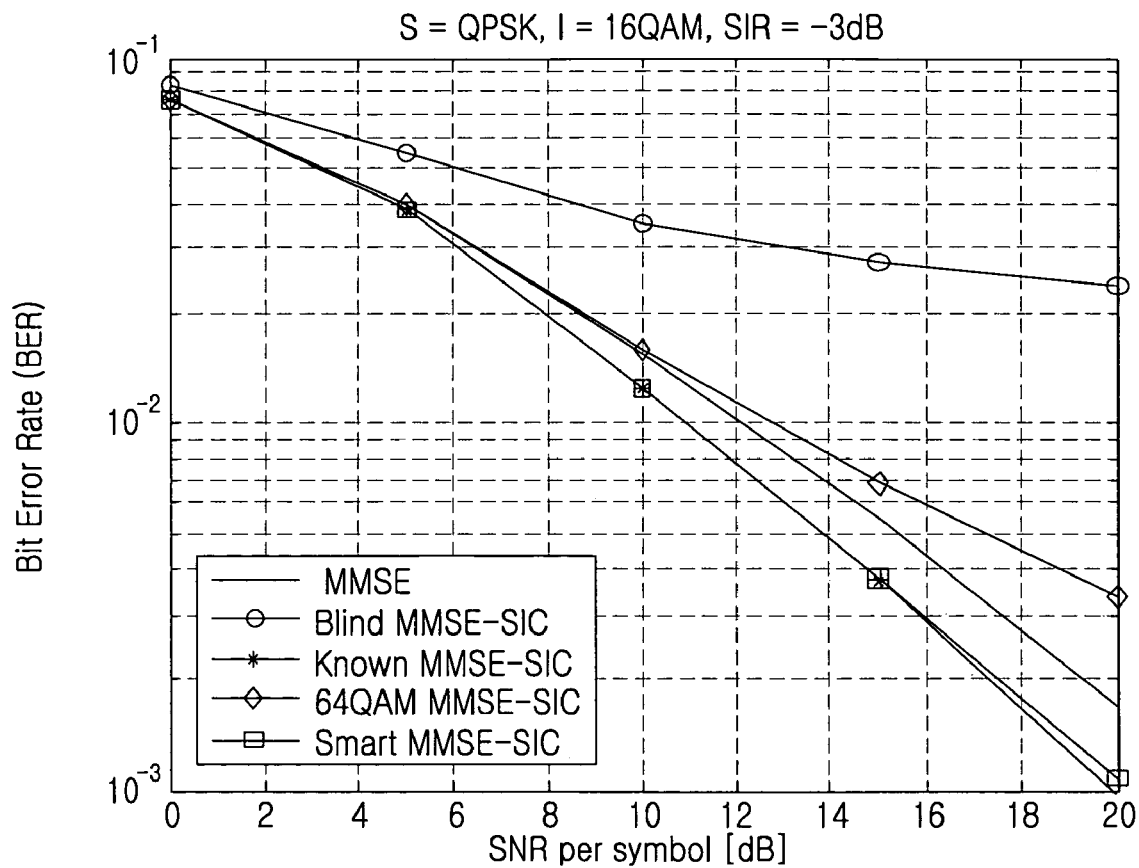
FIG. 8 illustrates the performance of the signal reception apparatus in which a signal detection scheme is an MMSE scheme, a desired signal modulation scheme is a QPSK scheme, an actual interference modulation scheme is a 16QAM scheme and an SIR is −3 dB.

FIG. 8 illustrates the performance of the signal reception apparatus in which a signal detection scheme is an MMSE scheme, a desired signal modulation scheme is a QPSK scheme, an actual interference modulation scheme is a 16QAM scheme and an SIR is –3 dB.

In FIG. 8, it is assumed that the signal reception apparatus includes two receive antennas and a Rayleigh fading channel of a single carrier is present. The signal detection scheme is the MMSE scheme, the desired signal modulation scheme is the QPSK scheme, the actual interference modulation scheme is the 16QM scheme and the SIR is –3 dB. Since an influence of the T length is large in which a short-term MSE value is computed when the signal reception apparatus sets a target estimation interference modulation scheme, T is set to, for example, about 100 symbols, in FIG. 8. Further, it should be noted that 'MMSE', 'Blind MMSE-IC', 'Known MMSE-IC', '64QAM MMSE-IC' and 'Smart MMSE-IC' as illustrated in FIG. 8 are the same as those as described with reference to FIG. 5.

As modulation order increases in the desired signal modulation scheme and the actual interference modulation scheme, the performance graph of FIG. 8 exhibits lower performance gain than that of FIG. 5. However, characteristics of the performance graph as illustrated in FIG. 8 are analogous to those of the performance graph as described with reference to FIG. 5.

As is apparent from the above description, the present invention improves signal reception performance by selecting whether to use interference cancellation according to a modulation scheme in a communication system. Moreover, the present invention improves signal reception performance by selecting whether to use interference cancellation according to a modulation scheme when each of the available signal detection schemes is used in a communication system.

The present invention further improves signal reception performance by setting a target estimation interference modulation scheme also when an actual interference modulation scheme applied in a neighbor BS is blind as when the actual interference modulation scheme is correctly known to select whether to use the interference cancellation in a communication system.

While the invention has been shown and described with reference to preferred embodiments of the present invention thereof, it will be understood by those skilled in the art that various changes in form and details may be made therein without departing from the spirit and scope of the present invention as defined by the appended claims and their equivalents.

What is claimed is:

1. A method for receiving a signal in a signal reception apparatus, comprising:

receiving, from a serving base station, information regarding a first modulation scheme applied to a frequency domain in the serving base station;

receiving a signal of the frequency domain;

demodulating the received signal using the first modulation scheme information, the demodulated signal including traffic data and a pilot signal;

generating channel state information using the pilot signal;

setting a second modulation scheme by estimating the second modulation scheme applied to the frequency domain in at least one neighbor base station from the demodulated signal; and selecting whether to use interference cancellation based on the channel state information, a first weight according to the first modulation scheme and a second weight according to the second modulation scheme, and according to a condition defined by the following equation:

$$\frac{\sum_{j=1}^{2}|h_{i,j}|^2}{\beta_i k_i} \underset{<}{\overset{\text{ON}}{\underset{\text{OFF}}{\geq}}} \frac{\sum_{j=1}^{2}|h_{s,j}|^2}{\beta_s k_s},$$

where s is an index of a signal of the frequency domain transmitted from the serving base station, i is an index of a signal of the frequency domain transmitted from the at least one neighbor base station, j is an index of a receive antenna provided in the signal reception apparatus, k is modulation order representing a modulation scheme, h is a channel response, β is a weight assigned to select whether to use the interference cancellation while considering the modulation order, ON indicates that use of the interference cancellation is selected if an associated condition is satisfied, and OFF indicates that the use of the interference cancellation is not selected if an associated condition is satisfied.

2. The method of claim 1, wherein the channel state information comprises information about channel power when a signal detection scheme applied to the received signal is a Maximum Ratio Combining (MRC) scheme.

3. The method of claim 1, wherein the channel state information comprises a Signal to Interference and Noise Ratio (SINR) when a signal detection scheme applied to the received signal is a Minimum Mean Square Error (MMSE) scheme.

4. The method of claim 3, wherein selecting whether to use the interference cancellation comprises:
selecting whether to use the interference cancellation according to a condition defined by the following equation:

$$a_{11}\beta_s k_s \underset{<}{\overset{\text{ON}}{\underset{\text{OFF}}{\geq}}} a_{22}\beta_i k_i,$$

where s is an index of a desired signal corresponding to a signal of the frequency domain transmitted from the serving base station, i is an index of an interference signal corresponding to a signal of the frequency domain transmitted from the at least one neighbor base station, k is modulation order representing a modulation scheme, β is a weight assigned to select whether to use the interference cancellation while considering the modulation order, $a_{11}$ is a reciprocal of an approximated SINR of the desired signal when the SINR of the desired signal is approximated to a reciprocal of a Mean Square Error (MSE) of the desired signal, $a_{22}$ is a reciprocal of an approximated SINR of the interference signal when the SINR of the interference signal is approximated to a reciprocal of an MSE of the interference signal, ON indicates that use of the interference cancellation is selected if an associated condition is satisfied, and OFF indicates that the use of the interference cancellation is not selected if an associated condition is satisfied.

5. The method of claim 1, wherein setting the second modulation scheme comprises:
setting the second modulation scheme to a highest-order modulation scheme available in a communication system.

6. The method of claim 1, wherein setting the second modulation scheme comprises:
setting an interference modulation scheme, serving as a modulation scheme to be applied to the frequency domain in the at least one neighbor base station, to a temporary estimation interference modulation scheme while sequentially increasing modulation order from a lowest-order modulation scheme to a highest-order modulation scheme available in a communication system;
comparing a short-term Mean Square Error (MSE) value of the highest-order modulation scheme applied to the received signal with that of the temporary estimation interference modulation scheme applied to the received signal; and
setting the second modulation scheme to the temporary estimation interference modulation scheme when the short-term MSE value of the temporary estimation interference modulation scheme is less than or equal to that of the highest-order modulation scheme.

7. The method of claim 1, wherein generating the channel state information using the pilot signal comprises:
estimating a channel coefficient and a noise variance by performing channel estimation using the pilot signal; and
generating the channel state information using the estimated channel coefficient and the noise variance.

8. The method of claim 1, further comprising:
detecting an interference signal from the traffic data when the use of the interference cancellation is selected;
regenerating an interference signal corresponding to the detected interference signal;
subtracting the regenerated interference signal from the traffic data; and
detecting a desired signal from a signal generated by subtracting the regenerated interference signal from the traffic data.

9. An apparatus for receiving a signal in a communication system, comprising:
a demodulator for receiving, from a serving base station, information regarding a first modulation scheme applied to a frequency domain in the serving base station, receiving a signal of the frequency domain and demodulating the received signal using the first modulation scheme information, the demodulated signal including traffic data and a pilot signal;
a controller for setting a second modulation scheme by estimating the second modulation scheme applied to the frequency domain in at least one neighbor base station from the demodulated signal;
a channel estimator for generating channel state information by using the pilot signal; and
a selector for selecting whether to use interference cancellation the channel state information, a first weight according to the first modulation scheme and a second weight according to the second modulation scheme, and according to a condition defined by the following equation:

$$\frac{\sum_{j=1}^{2}|h_{i,j}|^2}{\beta_i k_i} \underset{<}{\overset{ON}{\gtreqless}} \frac{\sum_{j=1}^{2}|h_{s,j}|^2}{\beta_s k_s},$$
$$\text{OFF}$$

where s is an index of a signal of the frequency domain transmitted from the serving base station, i is an index of a signal of the frequency domain transmitted from the at least one neighbor base station, j is an index of a receive antenna provided in the apparatus, k is modulation order representing a modulation scheme, β is a weight assigned to select whether to use the interference cancellation while considering the modulation order, h is a channel response, ON indicates that use of the interference cancellation is selected if an associated condition is satisfied, and OFF indicates that the use of the interference cancellation is not selected if an associated condition is satisfied.

10. The apparatus of claim 9, wherein the channel state information comprises information about channel power when a signal detection scheme applied to the received signal is a Maximum Ratio Combining (MRC) scheme.

11. The apparatus of claim 9, wherein the channel state information comprises a Signal to Interference and Noise Ratio (SINR) when a signal detection scheme applied to the received signal is a Minimum Mean Square Error (MMSE) scheme.

12. The apparatus of claim 11, wherein the selector selects whether to use the interference cancellation according to a condition defined by the following equation:

$$a_{11}\beta_s k_s \underset{<}{\overset{ON}{\gtreqless}} a_{22}\beta_i k_i,$$
$$\text{OFF}$$

where s is an index of a desired signal corresponding to a signal of the frequency domain transmitted from the serving base station, i is an index of an interference signal corresponding to a signal of the frequency domain transmitted from the at least one neighbor base station, k is modulation order representing a modulation scheme, β is a weight assigned to select whether to use the interference cancellation while considering the modulation order, $a_{11}$ is a reciprocal of an approximated SINR of the desired signal when the SNR of the desired signal is approximated to a reciprocal of a Mean Square Error (MSE) of the desired signal, $a_{22}$ is a reciprocal of an approximated SINR of the interference signal when the SINR of the interference signal is approximated to a reciprocal of an MSE of the interference signal, ON indicates that use of the interference cancellation is selected if an associated condition is satisfied, and OFF indicates that the use of the interference cancellation is not selected if an associated condition is satisfied.

13. The apparatus of claim 9, wherein the controller sets the second modulation scheme to a highest-order modulation scheme available in the communication system.

14. The apparatus of claim 9, wherein the controller:
sets an interference modulation scheme, serving as a modulation scheme to be applied to the frequency domain in the at least one neighbor base station, to a temporary estimation interference modulation scheme while sequentially increasing modulation order from a lowest-order modulation scheme to a highest-order modulation scheme available in the communication system;
compares a short-term Mean Square Error (MSE) value of the highest-order modulation scheme applied to the received signal with that of the temporary estimation interference modulation scheme applied to the received signal; and
sets the second modulation scheme to the temporary estimation interference modulation scheme when the short-term MSE value of the temporary estimation interference modulation scheme is less than or equal to that of the highest-order modulation scheme.

15. The apparatus of claim 9, wherein the channel estimator estimates a channel coefficient and a noise variance by performing channel estimation using the pilot signal, and generates the channel state information using the estimated channel coefficient and the noise variance.

16. The apparatus of claim 9, further comprising:
an interference signal detector for detecting an interference signal from the traffic data when the use of the interference cancellation is selected;
an interference signal regenerator for regenerating an interference signal corresponding to the detected interference signal;
a subtractor for subtracting the regenerated interference signal from the traffic data; and
a desired signal detector for detecting a desired signal from a signal generated by subtracting the regenerated interference signal from the traffic data.

* * * * *